United States Patent
Nakahara et al.

(10) Patent No.: US 9,806,339 B2
(45) Date of Patent: Oct. 31, 2017

(54) TITANIUM-NIOBIUM COMPOSITE OXIDE-BASED ELECTRODE ACTIVE MATERIAL AND LITHIUM SECONDARY BATTERY USING THE SAME

(71) Applicants: TITAN KOGYO KABUSHIKI KAISHA, Ube-shi (JP); Kabushiki Kaisha Toshiba, Minato-ku (JP)

(72) Inventors: Kiyoshi Nakahara, Ube (JP); Toshimasa Seki, Ube (JP); Hidenori Ishioka, Ube (JP); Wataru Mino, Ube (JP); Yasuhiro Harada, Isehara (JP); Norio Takami, Yokohama (JP); Hiroki Inagaki, Yokohama (JP)

(73) Assignees: TITAN KOGYO KABUSHIKI KAISHA, Ube-shi (JP); KABUSHIKI KAISHA TOSHIBA, Minato-ku (JP)

( * ) Notice: Subject to any disclaimer, the term of this patent is extended or adjusted under 35 U.S.C. 154(b) by 243 days.

(21) Appl. No.: 14/627,682

(22) Filed: Feb. 20, 2015

(65) Prior Publication Data
US 2015/0243979 A1     Aug. 27, 2015

(30) Foreign Application Priority Data

Feb. 24, 2014   (JP) .................................. 2014-032601

(51) Int. Cl.
*H01M 4/13*     (2010.01)
*H01M 4/58*     (2010.01)
(Continued)

(52) U.S. Cl.
CPC ............ *H01M 4/485* (2013.01); *C01G 33/00* (2013.01); *C01G 33/006* (2013.01); *H01M 4/0402* (2013.01); *H01M 4/0471* (2013.01); *H01M 4/366* (2013.01); *H01M 4/623* (2013.01); *H01M 4/625* (2013.01); *H01M 10/052* (2013.01);
(Continued)

(58) Field of Classification Search
None
See application file for complete search history.

(56) References Cited

U.S. PATENT DOCUMENTS

| 2009/0035659 A1* | 2/2009 | Takeuchi | H01M 4/485 |
| | | | 429/223 |
| 2012/0052401 A1* | 3/2012 | Goodenough | C01G 33/00 |
| | | | 429/341 |

(Continued)

FOREIGN PATENT DOCUMENTS

| CN | 103594693 A | 2/2014 |
| EP | 2 448 054 A1 | 5/2012 |

(Continued)

OTHER PUBLICATIONS

Extended European Search Report dated Jul. 9, 2015 in Patent Application No. 15155674.3.

(Continued)

*Primary Examiner* — Eli Mekhlin
(74) *Attorney, Agent, or Firm* — Oblon, McClelland, Maier & Neustadt, L.L.P.

(57) ABSTRACT

An electrode active material comprising in major proportions a monoclinic titanium-niobium composite oxide represented by the formula $TiNb_xO_{(2+5x/2)}$, wherein X is from 1.90 or more to less than 2.00.

11 Claims, 3 Drawing Sheets

(51) Int. Cl.

| | |
|---|---|
| *H01M 4/485* | (2010.01) |
| *C01G 33/00* | (2006.01) |
| *H01M 4/04* | (2006.01) |
| *H01M 4/36* | (2006.01) |
| *H01M 4/62* | (2006.01) |
| *H01M 10/052* | (2010.01) |

(52) U.S. Cl.
CPC ...... *C01P 2002/60* (2013.01); *C01P 2002/72* (2013.01); *C01P 2004/61* (2013.01); *C01P 2006/40* (2013.01)

(56) References Cited

U.S. PATENT DOCUMENTS

| | | |
|---|---|---|
| 2012/0107692 A1 | 5/2012 | Harada et al. |
| 2012/0244442 A1 | 9/2012 | Harada et al. |
| 2012/0305856 A1 | 12/2012 | Yang et al. |

FOREIGN PATENT DOCUMENTS

| | | |
|---|---|---|
| EP | 2 503 625 A2 | 9/2012 |
| JP | 2010-287496 | 12/2010 |
| JP | 5230713 B2 | 7/2013 |
| JP | 2013-535787 | 9/2013 |
| WO | WO 2012/016185 A2 | 2/2012 |

OTHER PUBLICATIONS

Jian-Tao Han, et al., "New Anode Framework for Rechargeable Lithium Batteries", Chemistry of Materials, 23, 2011, pp. 2027-2029.

\* cited by examiner

TITANIUM-NIOBIUM COMPOSITE OXIDE-BASED ELECTRODE ACTIVE MATERIAL AND LITHIUM SECONDARY BATTERY USING THE SAME

TECHNICAL FIELD

The present invention relates to a titanium-niobium composite oxide that is useful as an active material for lithium secondary batteries and to a lithium secondary battery using the titanium-niobium composite oxide.

BACKGROUND ART

Lithium secondary batteries have progressed as electric power supplies for cellular phones and laptop computers because the energy densities of lithium secondary batteries are high. However, with the reduction in size and weight of portable terminal devices caused by the recent progress of IT technology, demands for the further downsizing and capacity increasing of the batteries as the electric power supplies of such devices have been growing. Additionally, lithium secondary batteries have come to attract attention as electric power supplies for electric automobiles and hybrid automobiles and as electric power supplies for power storage, making the most of the high energy densities of lithium secondary batteries.

As the anode materials of lithium batteries, carbon-based anodes have hitherto been commonly used, and lithium secondary batteries using carbon-based anodes are characterized in that the voltage and the energy density are high at the time of discharge. However, since the potential of the anode is low, rapid charge causes the deposition of lithium metal and increases the risk of causing internal short-circuit, and there is an inherent risk of ignition caused by such internal short-circuit. Under these circumstances, there have been investigated lithium batteries with high safety and long life that are obtained by using a high-potential anode to reduce heat generation at the time of internal short-circuit and suppressing the decomposition of electrolyte solution. Especially $Li_4Ti_5O_{12}$ has a potential of 1.5 V based on lithium, does not change in volume at the time of charge or discharge and is extremely good in cycle characteristics, and hence coin batteries using $Li_4Ti_5O_{12}$ have been put into practical use.

However, the theoretical capacity of $Li_4Ti_5O_{12}$ is 175 mAh/g, which is disadvantageous in that the electric capacity of $Li_4Ti_5O_{12}$ is as small as approximately half the electric capacity of carbon, which is commonly used as an anode material, leading to the small energy densities of lithium secondary batteries using $Li_4Ti_5O_{12}$. From the viewpoint of their safety and long life, an anode material having a voltage of 1.0 to 1.5 V based on lithium and a large electric capacity has been demanded.

Under such circumstances, titanium-niobium composite oxides have been attracting attention as electrode materials having a voltage of 1.0 to 2.0 V based on lithium and a large electric capacity.

When lithium secondary batteries are used as anode materials, energy density can be increased because titanium-niobium composite oxides can maintain electroneutrality of crystals against intercalation and deintercalation of lithium ions, through a redox reaction between $Ti^{4+}$ and $Nb^{5+}$.

As examples of application of titanium-niobium composite oxides, $TiNb_2O_7$, $Ti_2Nb_{10}O_{29}$ and $TiNb_{24}O_{62}$ are under study using a solid-phase method in which $TiO_2$ and $Nb_2O_5$ are mixed and fired, and titanium-niobium composite oxides having a specific surface area of 0.18 m²/g or more have exhibited a large electric capacity of 228 to 277 mAh/g (Patent Document 1: Japanese Patent Publication No. 2010-287496). Further, it has been found that C—$TiNb_2O_7$ or C—$Ti_{1-y}Nb_yNb_2O_7$, formed by carbon coating on $TiNb_2O_7$ or $Ti_{1-y}Nb_yNb_2O_7$ obtained by firing after homogenous mixing of Ti and Nb by a sol-gel method, for the purpose of increasing conductive property and stabilizing the valence state of Nb(IV), have exhibited a large electric capacity of 285 mAh/g in charge or discharge at 1.0 to 2.5 V (Non-patent Document 1: Jian-Tao, Yun-Hui Huang, and J. B. Goodenough, Chemistry of Materials, 23 (2011) 2027-2029. Patent Document 2: Japanese Patent Publication No. 2013-535787). Lithium ion secondary batteries using as an anode material a monoclinic complex oxide comprising $TiNb_2O_7$ in which crystallites have been grown in a [001] direction in a solid-phase method have an initial discharge capacity of 261 to 279 mAh/g (Patent Document 3: Japanese Patent No. 5230713).

However, a problem of the titanium-niobium composite oxides obtained by solid-phase methods is that when the size of their particles is reduced by pulverization, the charge and discharge capacity is increased while the cycle characteristics are reduced. It was presumed that a cause of this problem is that the pulverization results in collapse of a part of the crystalline structure, destabilizing the valence state of Nb. In sol-gel methods, low firing temperatures can be set and fine particles of titanium-niobium composite oxides are produced, but their crystallinity is low and hence, the cycle characteristics are poor. For this reason, the cycle characteristics have been enhanced by coating with carbon and the increase of the amount of conducting agent used in preparation of electrodes, but sufficient effects have not been necessarily obtained. Another disadvantage of sol-gel methods is that production cost is high because expensive starting materials are used.

SUMMARY OF INVENTION

An object of the present invention is to provide titanium-niobium composite oxides having a large electric capacity and a superior cycle capacity retention rate by an inexpensive solid-phase method.

As a result of studies on the compositional features of titanium-niobium composite oxides obtained by inexpensive solid-phase methods and on production methods for the composite oxides, the inventors of the present invention have found that a composite oxide in which titanium ($TiO_2$) is present in a proportion higher than niobium ($Nb_2O_5$) has a larger electric capacity than a composite oxide composed of the two components in an equimolar ratio and that a titanium-niobium composite oxide having a superior cycle capacity retention rate is obtained by carbon coating. These findings have led to the completion of the present invention.

The electrode active material of the present invention comprises in major proportions a monoclinic titanium-niobium composite oxide represented by the formula $TiNb_xO_{(2+5x/2)}$, wherein X is from 1.90 or more to less than 2.00. It is presumed that titanium-niobium composite oxides in which the Nb component is present in a higher proportion are more advantageous in terms of electric capacity. However, in a solid-phase method in which titanium oxide and $Nb(OH)_5$ are dry mixed and fired, which is a practical production method, titanium-niobium composite oxides composed of a higher proportion of niobium cause the intermediate product $3Nb_2O_5 \cdot TiO_2$ to remain easily and do not contribute to the increase of electric capacity. Instead, in titanium-niobium composite oxides composed of a higher proportion of titanium, the electric capacity was larger. It is presumed that the reason is that even when remaining in such composite oxides composed of a higher proportion of titanium, rutile-type titanium oxide has less influence on the electric capacity.

In measurement for the titanium-niobium composite oxide by an X-ray powder diffraction method, when a crystallite size determined from a full-width at half maximum of a (−110) diffraction line is 85 nm or more, the crystalline structure is rigid and hence, an electrode active material having a superior cycle capacity retention rate is obtained.

Further, the titanium-niobium composite oxide of the present invention and an organic material are mixed together and heated under a non-oxidizing atmosphere to decompose and carbonize the organic material, thereby carrying out coating with 1.0 to 5.0 wt. % of carbon. When the specific resistance of powder (specific resistance (powder)) reaches $1.0 \times 10^4$ Ω·cm or less, the cycle capacity retention rate is further increased. Especially when the mixture is used as a coating material for electrodes, it is preferable in handling that the mixture is in the form of a spherical or massive aggregate of primary particles and that the aggregate (secondary particles) has an average particle size of 1 μm or more to 50 μm or less.

When the electrode active material comprising in major proportions the titanium-niobium composite oxide of the present invention is used to prepare a lithium secondary battery using Li metal as a counter electrode, the discharge capacity at the 1st cycle is 280 mAh/g or more in a charge and discharge test conducted at 54 mA per gram of the active material. The titanium-niobium composite oxide may be used as a cathode or anode active material in battery electrodes and has superior properties especially in lithium secondary batteries.

ADVANTAGEOUS EFFECTS OF INVENTION

Lithium secondary batteries using the electrode active material comprising in major proportions a titanium-niobium composite oxide according to the present invention in which the titanium component is present in a higher proportion in a molar ratio between titanium ($TiO_2$) and niobium ($Nb_2O_5$) have a high charge and discharge capacity and a superior cycle capacity retention rate.

DESCRIPTION OF EMBODIMENTS

Figure 1:
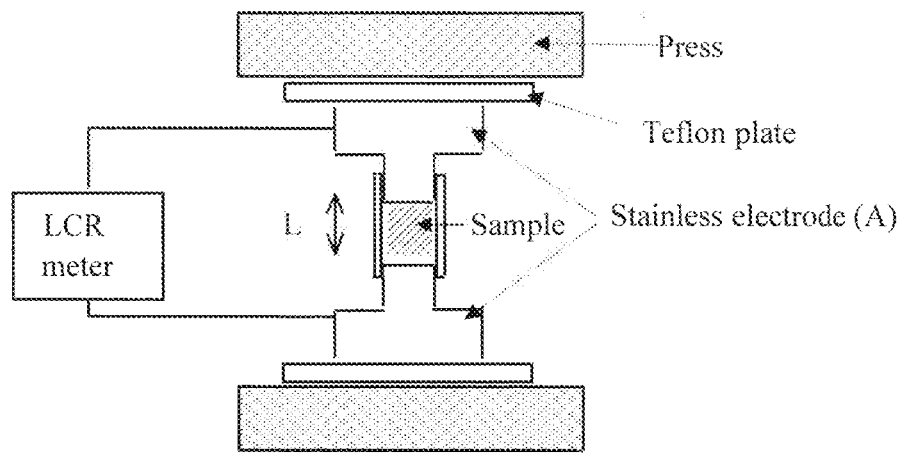
FIG. 1 is a schematic view illustrating measurement of specific resistance (powder).

Hereinafter, the electrode active materials comprising in major proportions a titanium-niobium composite oxide according to the present invention and lithium secondary batteries using the electrode active material are described in detail.

(Composition)

The crystalline structure of the titanium-niobium composite oxide used in the present invention is a monoclinic structure regarded as being advantageous to lithium ion migration, and the composite oxide as represented by the chemical formula $TiNb_xO_{(2+5x/2)}$ has the largest electric capacity when X in the formula is from 1.90 or more to less than 2.00, where titanium ($TiO_2$) is present in a proportion higher than niobium ($Nb_2O_5$), compared with a composite oxide composed of the two components in an equimolar ratio. When X is smaller than the lower limit of this range, generation of rutile-type titanium oxide is clearly observed and, as X is smaller, the electric capacity is smaller. In contrast, when X is larger than the upper limit of this range, $3Nb_2O_5 \cdot TiO_2$ is generated and, as X is larger, the electric capacity is smaller.

(Crystallinity)

To obtain a compound having a single composition, the titanium-niobium composite oxide needs to be fired at a high temperature of 1000° C. or more, and the resulting product is a highly crystalline and very rigid aggregate. To use the titanium-niobium composite oxide as an electrode active material for lithium batteries, it is necessary to reduce the size of the primary particles so that they are suited for the thickness of coating film or devices for application. In general, the surface of particles to which a strong force has been applied with a pulverizer is amorphized and hence cycle characteristics become very poor, while in the present invention, the crystallinity of particle surface can be enhanced again by reheating and thus a highly crystalline titanium-niobium composite oxide with uniform in particle size can be produced.

It is possible to show the crystallinity by calculation of crystallite size using the Scherrer equation from a diffraction line determined by an X-ray diffraction method. In a measurement for the titanium-niobium composite oxide with an X-ray diffractometer using a Cu-Kα radiation source, when the crystallite size determined based on the (−110) plane at 2θ=23.9°±0.2° is greater than 85 nm, the electrode active material is superior in cycle capacity retention rate. The "cycle capacity retention rate" referred to in the present invention means a ratio of the discharge capacity at the 100th cycle to the discharge capacity at the 5th cycle when a charge and discharge cycle is repeated 100 times in a lithium secondary battery.

(Specific Resistance (Powder))

When the specific resistance (powder) of the titanium-niobium composite oxide is $1 \times 10^5$ Ω·cm or more, the electric conductivity is very poor and, when this composite oxide is used as an electrode material, electrons do not migrate rapidly and the coulombic efficiency is low, which results in poor cycle characteristics. To make up for this defect, the titanium-niobium composite oxide of the present invention may be coated with carbon. The cycle characteristics are further enhanced with a carbon content of 1.0 to 5.0 wt. % and a specific resistance (powder) of $1.0 \times 10^4$ Ω·cm or less. The carbon used for coating can relieve the direct contact of the highly active particle surface of the titanium-niobium composite oxide with an electrolyte solution, suppress the decomposition of the electrolyte solution, and contribute to the prolongation of battery life.

(Particle Size)

Primary particles of the titanium-niobium composite oxide aggregate to form a spherical or massive aggregate, while use of a spray drying method enables very uniform carbon coating and contributes greatly to the enhancement of cycle characteristics. The particles aggregated to form a 1 to 50 μm spherical or massive aggregate have an apparent density of 0.8 g/cm$^3$ or more and are good in handling and advantageous in packing of the coating film.

[Production Method]

Hereinafter, methods for producing the electrode active material comprising in major proportions a titanium-niobium composite oxide according to the present invention are described in detail.

(Starting Materials)

Titanium source materials that can be used are anatase-type titanium oxide, rutile-type titanium oxide, hydrous titanium oxide (metatitanic acid), and titanium hydroxide, and it is preferable to use anatase-type titanium oxide or hydrous titanium oxide, both of which are reactive. Niobium source materials that can be used are niobium hydroxide and niobium pentoxide.

(Mixing)

Such a titanium source material and a niobium source material are mixed to prepare a source material mixture. The mixing ratio between titanium and niobium is a Nb/Ti molar ratio of from 1.90 or more to less than 2.00. A common pulverizing mixer such as a Henschel mixer, a vibration mill, a planet ball mill, or an automatic mortar may be used, and the source material mixture may be prepared by adding the source materials to a water system to prepare slurry and either drying up the slurry by a method such as spray drying with a spray dryer or the like or spray pyrolysis, or carrying out solid-liquid separation with a Buchner funnel, a filter press or a centrifuge followed by drying. In the latter case, i.e., the wet mixing of the source materials, reactivity can be enhanced by pulverization and mixing of the source materials beforehand with a ball mill or the like.

(Firing)

The source material mixture is fired in the air within the range of 1000 to 1300° C. The firing time may be adjusted appropriately according to the firing temperature and the feed amount in furnace. For cooling, the fired product may be cooled by natural cooling in the furnace or may be taken out of the furnace and left to cool; the method for cooling is not particularly limited. The obtained fired product can be evaluated by identification of its constituent phases by X-ray diffraction, and the main component is a monoclinic titanium-niobium composite oxide that belongs to the space group I2/m and it is preferable that the fired product is free from 3Nb$_2$O$_5$·TiO$_2$, which is a Nb-excessive phase. When the proportion of Ti is high, a diffraction line attributed to the rutile phase appears, but the battery properties are less influenced within the range of the aforementioned Nb/Ti molar ratio.

(Pulverization)

The fired product is pulverized once or more, where necessary, with at least one type of pulverizer selected from dry pulverizers and wet pulverizers, such as compaction pulverizers, vibration mills, hammer mills, jet mills, and bead mills. Use of a combination of at least two types of pulverizers according to particle size is more effective.

(Carbon Coating)

The carbon coating can be formed uniformly on the surface of titanium-niobium composite oxide particles by the steps of: preparing a mixture of the titanium-niobium composite oxide particles and a carbon-containing organic material by either dry mixing them or spray drying slurry containing them with a spray dryer; and heating this mixture to 650 to 800° C. under a non-oxidizing atmosphere to decompose and carbonize the organic material. As the organic material, all organic materials composed of either carbon or carbon, hydrogen and oxygen may be used; however, when the mixture is prepared by spray drying or the like, water-soluble saccharides such as glucose and maltose and water-soluble alcohols such as PVA are preferred. By use of these organic materials, the properties obtained at a firing temperature of 650° C. or more are as follows: specific resistance (powder): $1.0 \times 10^4$ Ω·cm or less; discharge capacity at the 1st cycle: 280 mAh/g or more; capacity retention rate at the 100th cycle: 90% or more; and 10C/0.2C capacity retention rate: 50% or more. At a firing temperature of less than 650° C., the specific resistance (powder) is $1.0 \times 10^4$ Ω·cm or more, the discharge capacity is equivalent to the above-mentioned discharge capacity, and the capacity retention rate at the 100th cycle and the 10C/0.2C capacity retention rate are both lower. The coating with carbon in the proportion of 1.0 to 5.0 wt. % relative to the titanium-niobium composite oxide particles, preferably 1.5 to 3.6 wt. % relative to the composite oxide particles, can lead to good battery properties. The content of carbon for coating can be controlled by the amount of the added organic material under the same firing conditions. Since the particle surface can be coated uniformly with carbon in accordance with this carbon coating method, electric conductivity equivalent to that in the case of addition of a conducting agent in preparation of a battery can be imparted using a smaller amount of carbon than that in the case of addition of a conducting agent. Even if a conducting agent is added in preparation of a battery, an advantageous effect that is equivalent to the above-described enhancement of battery performance cannot be obtained.

(Electrode Active Material)

The electrode active material of the present invention comprises in major proportions the aforementioned titanium-niobium composite oxide particles, preferably, carbon-coated titanium-niobium composite oxide particles, and may contain a conducting agent and a binder as contained in common electrode active materials. Examples of the conducting agent may include carbon materials such as carbon black, acetylene black, graphite, carbon nanotubes, and carbon fibers. Examples of the binder may include polymers such as polyacrylonitrile, polyvinylidene fluoride, polyvinylpyrrolidone, and polymethyl methacrylate. The ratio between the titanium-niobium composite oxide particles or the carbon-coated titanium-niobium composite oxide particles, the conducting agent, and the binder is preferably 90:5:5 to 70:15:15 (wt. %).

(Electrode and Secondary Battery)

In accordance with a common technique, electrodes comprising the electrode active material of the present invention and secondary batteries comprising the electrode may be produced. An electrode having a layer of the electrode active material may be produced by adding the electrode active material to an organic solvent to prepare slurry and applying the slurry on an electrode substrate to form a predetermined thickness of the layer. Examples of the organic solvent may include cyclic amides such as N-methylpyrrolidone, linear amides such as N,N-dimethylformamide and N,N-dimethylacetamide, aromatic hydrocarbons such as anisole, toluene and xylene, and alcohols such as butanol and cyclohexanol. The concentration of the electrode active material in the slurry is preferably 30 to 70 wt. % as a concentration of a solid content containing a conducting agent and a binder. The electrode active materials are easily aggregated in a concentration higher than the upper limit, while they are easily deposited in a concentration lower than the lower limit.

The secondary battery is suitably a non-aqueous electrolyte lithium secondary battery having a Li-containing counter electrode. The counter electrode may be a common Li electrode, without any limitations. The electrolyte may be a common non-aqueous electrolyte, without any limitations.

EXAMPLES

The present invention is described in more detail below with reference to examples. The examples shown below are merely provided for illustrative purposes and do not limit the scope of the invention.

Example 1

Anatase-type titanium oxide powder and niobium hydroxide powder were weighed in a molar ratio of Ti:Nb=1:1.99, put into a vibration ball mill, and pulverized and mixed for 9 hours. This mixture was taken out of the ball mill and fired in a box-type electric furnace at 1100° C. for 12 hours. The fired product was pulverized with a hammer mill and then prepared into slurry, maltose powder was added in a proportion of 10 wt. % relative to the solid content of the slurry, and the resulting mixture was spray dried with a spray dryer. The powder obtained was put into a rotary electric furnace and heat treated under a non-oxidizing atmosphere at 700° C. for 3 hours to give Sample 1 that is titanium-niobium composite oxide particles coated with 2.2 wt. % of carbon.

The intensities of Nb and Ti in Sample 1 which was obtained above were measured with an X-ray fluorescence spectrometer (trade name: XRF-1700, manufactured by Shimadzu Corp.). The Nb/Ti molar ratio as calculated by an analysis software was 1.99. The X-ray diffraction pattern was determined with an X-ray diffractometer (trade name: RINT-TTR III, manufactured by Rigaku Corp.) and the constituent phase could be identified by an analysis software as a single phase of $TiNb_2O_7$. The crystallite size was 97 nm as calculated by the Scherrer equation from a full-width at half maximum of a (−110) diffraction line at $2\theta=23.9°\pm0.2°$ in the X-ray diffraction pattern. Five grams of Sample 1 was weighed out, powder of Sample 1 was sandwiched between stainless electrodes (A), as illustrated by FIG. 1, and compressed at 223 kg/cm² with an oil hydraulic press, thereafter the resistance R ($\Omega$) was measured with an LCR meter, the thickness L (mm) obtained after the compression of powder of Sample 1 was measured, and the specific resistance (powder) was calculated by the formula R×Area (mm) of electrode/L. The calculated specific resistance (powder) was 100 $\Omega$·cm. The carbon used for coating was removed by heat treatment in the air at 600° C. for 1 hour and thereafter the average particle size of secondary particles was measured with a particle size distribution measuring device (trade name: Microtrack HRA, manufactured by Nikkiso Co., Ltd.). The average particle size was 9.7 μm.

Figure 2:
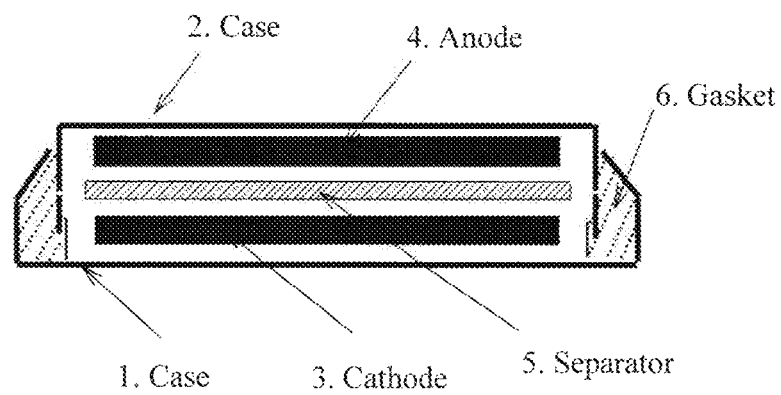
FIG. 2 is a schematic view of an evaluated coin battery.
Figure 3:
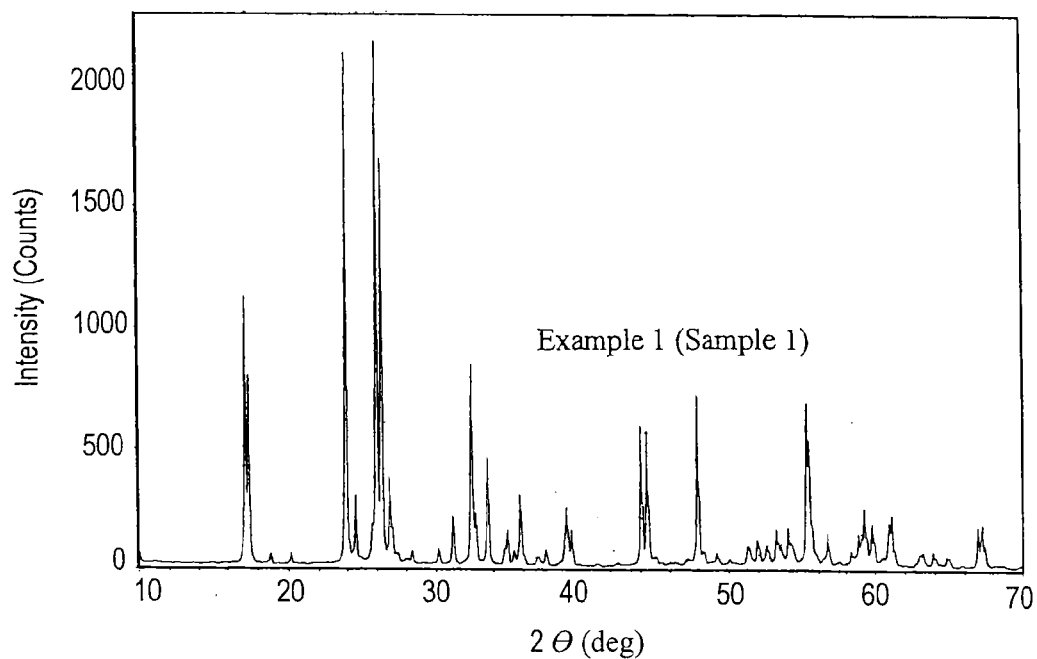
FIG. 3 is an X-ray diffraction diagram of Example 1 (Sample 1).
Figure 4:
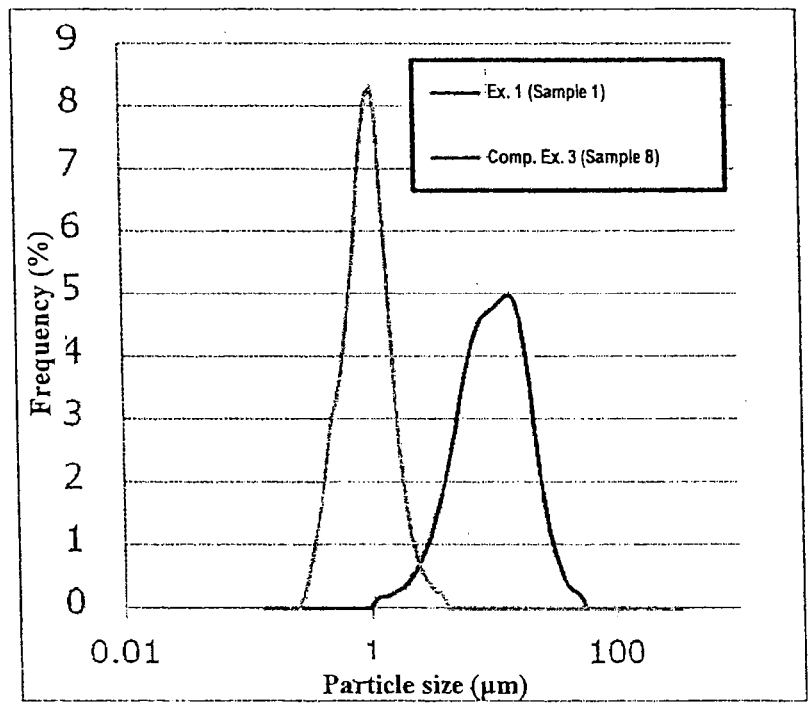
FIG. 4 is a chart showing the particle size distributions of Example 1 and Comparative Example 3.
Figure 5:
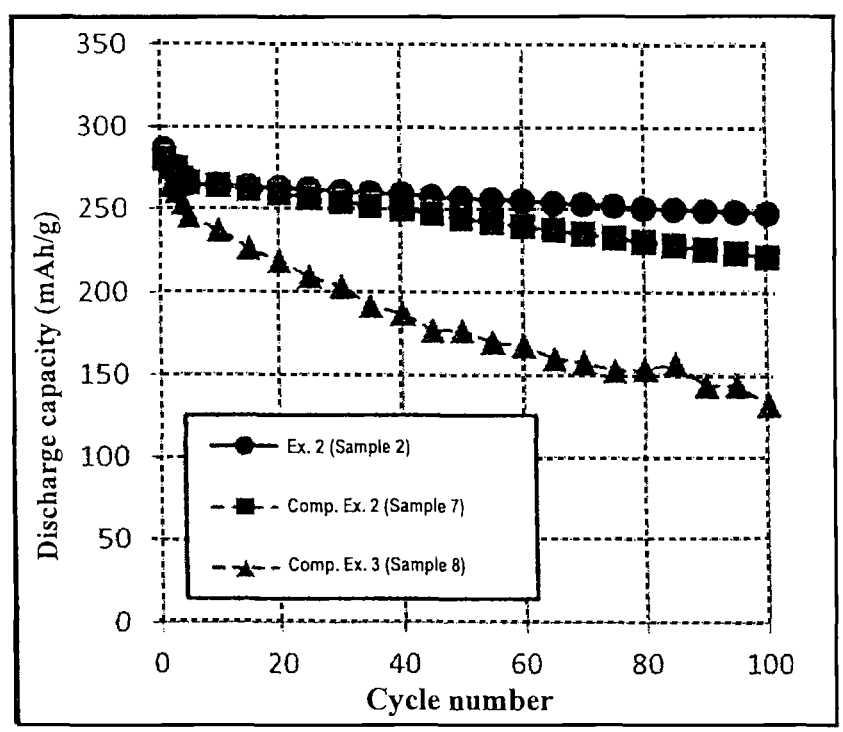
FIG. 5 is a chart showing the cycle properties of Example 2, Comparative Example 2, and Comparative Example 3.

Next, 82 wt. % of powder of Sample 1, 9 wt. % of acetylene black and 9 wt. % of polyvinylidene fluoride were mixed together and then this mixture was added in a solid content concentration of 30 wt. % to N-methyl-2-pyrrolidone. The resulting mixture was kneaded with a high shear mixer for 15 minutes to prepare a coating material. This coating material was applied onto an aluminum foil by a doctor blade method. After drying in vacuo at 110° C., this electrode mixture paste was roll-pressed to reduce its thickness to 80% of the initial thickness. The electrode mixture paste to which the coating material was applied was punched into a circle having an area of 0.95 cm² to prepare a cathode 3 of a coin battery illustrated by FIG. 2. In FIG. 2, an anode 4 is a lithium metal plate, an electrolyte solution used is a solution prepared by dissolving $LiPF_6$ in a concentration of 1 mol/L in a mixture of equal volumes of ethylene carbonate and dimethyl carbonate, and a separator 5 is a glass filter. The coin battery prepared as described above was discharged to 1.0 V at 54 mA per gram of the active material and thereafter the voltage 1.0 V was retained for a total of 10 hours with the current varied. The battery was subsequently charged to 3.0 V at a constant current of 54 mA, and this charge and discharge cycle at a current corresponding to 0.2C was repeated three times. Next, the battery was discharged to 1.0 V at a current of 270 mA and thereafter the voltage 1.0 V was retained for 3 hours with the current varied. The battery was subsequently charged to 3.0 V at a constant current of 270 mA. This charge and discharge cycle at a current corresponding to 1C was repeated 97 times. As a result, the discharge capacities at the 1st cycle (0.2C), the 5th cycle (1C), and the 100th cycle (1C) were 288 mAh/g, 264 mAh/g, and 237 mAh/g, respectively. Good cycle stability was displayed with a discharge capacity retention rate of 90% after the 100th cycle relative to that at the 5th cycle. The process of Li intercalation was discharge, while the process of Li deintercalation was charge.

The 10C/0.2C retention rate, which serves as an indicator of rate characteristics, was evaluated by repeating a charge and discharge cycle 3 times at a constant current of 54 mA per gram of the active material of the coin battery, which corresponds to 0.2C, then discharging the battery to 1.0 V at the 4th cycle at a constant current of 2700 mA, which corresponds to 10C, and thereafter charging the battery at 54 mA. The discharge capacity at 0.2C at the 3rd cycle is referred to as $C_{(0.2C)}$ and the discharge capacity at 10C at the 4th cycle is referred to as $C_{(10C)}$, and a value calculated by the formula $C_{(10C)}/C_{(0.2C)}\times100$ is referred to as a 10C/0.2C retention rate. The 10C/0.2C retention rate of Sample 1 was 55%.

Example 2

The same procedures as in Example 1 were carried out to prepare Sample 2 that is titanium-niobium composite oxide particles coated with 2.1 wt. % of carbon, except that anatase-type titanium oxide powder and niobium oxide powder were weighed in a molar ratio of Ti:Nb=1:1.92. An analysis of Sample 2 that was conducted in the same manner as in Example 1 revealed that Sample 2 had a Nb/Ti molar ratio of 1.92, a crystallite size of 100 nm, a specific resistance (powder) of 85 $\Omega$·cm, and an average secondary particle size of 12.5 μm. A coin battery using Sample 2 was prepared and its battery performance was evaluated, revealing that the battery had discharge capacities of 286 mAh/g, 266 mAh/g, and 246 mAh/g at the 1st cycle (0.2C), the 5th cycle (1C), and the 100th cycle (1C), respectively, as well as a discharge capacity retention rate of 92% after the 100th cycle relative to that at the 5th cycle, and a 10C/0.2C retention rate of 59%.

Example 3

The same procedures as in Example 1 were carried out to prepare Sample 3 that is titanium-niobium composite oxide particles coated with 2.1 wt. % of carbon, except that the final heat treatment was carried out under a non-oxidizing atmosphere at 650° C. for 3 hours. An analysis of Sample 3 that was conducted in the same manner as in Example 1 revealed that Sample 3 had a Nb/Ti molar ratio of 1.99, a crystallite size of 96 nm, a specific resistance (powder) of 1230 $\Omega$·cm, and an average secondary particle size of 8.9 μm. A coin battery using Sample 3 was prepared and its battery performance was evaluated, revealing that the battery had discharge capacities of 284 mAh/g, 262 mAh/g, and 244 mAh/g at the 1st cycle (0.2C), the 5th cycle (1C), and the 100th cycle (1C), respectively, as well as a discharge capacity retention rate of 93% after the 100th cycle relative to that at the 5th cycle, and a 10C/0.2C retention rate of 51%.

Example 4

The same procedures as in Example 1 were carried out to prepare Sample 4 that is titanium-niobium composite oxide particles coated with 1.5 wt. % of carbon, except that the amount of maltose added as a carbon source was 6.5 wt. %. An analysis of Sample 4 that was conducted in the same manner as in Example 1 revealed that Sample 4 had a Nb/Ti molar ratio of 1.99, a crystallite size of 96 nm, a specific resistance (powder) of 96 Ω·cm, and an average secondary particle size of 7.7 μm. A coin battery using Sample 4 was prepared and its battery performance was evaluated, revealing that the battery had discharge capacities of 286 mAh/g, 267 mAh/g, and 241 mAh/g at the 1st cycle (0.2C), the 5th cycle (1C), and the 100th cycle (1C), respectively, as well as a discharge capacity retention rate of 90% after the 100th cycle relative to that at the 5th cycle, and a 10C/0.2C retention rate of 49%.

Example 5

The same procedures as in Example 1 were carried out to prepare Sample 5 that is titanium-niobium composite oxide particles coated with 1.5 wt. % of carbon, except that the amount of maltose added as a carbon source was 20 wt. %. An analysis of Sample 5 that was conducted in the same manner as in Example 1 revealed that Sample 5 had a Nb/Ti molar ratio of 1.94, a crystallite size of 94 nm, a specific resistance (powder) of 39 Ω·cm, and an average secondary particle size of 9.0 μm. A coin battery using Sample 5 was prepared and its battery performance was evaluated, revealing that the battery had discharge capacities of 286 mAh/g, 264 mAh/g, and 250 mAh/g at the 1st cycle (0.2C), the 5th cycle (1C), and the 100th cycle (1C), respectively, as well as a discharge capacity retention rate of 90% after the 100th cycle relative to that at the 5th cycle, and a 10C/0.2C retention rate of 55%.

Comparative Example 1

The same procedures as in Example 1 were carried out to prepare Sample 6 that is titanium-niobium composite oxide particles coated with 2.1 wt. % of carbon, except that anatase-type titanium oxide powder and niobium oxide powder were weighed in a molar ratio of Ti:Nb=1:1.85. An analysis of Sample 6 that was conducted in the same manner as in Example 1 revealed that Sample 6 had a Nb/Ti molar ratio of 1.85, a crystallite size of 98 nm, a specific resistance (powder) of 72 Ω·cm, and an average secondary particle size of 8.1 μm. A coin battery using Sample 6 was prepared and its battery performance was evaluated, revealing that the battery had discharge capacities of 280 mAh/g, 263 mAh/g, and 225 mAh/g at the 1st cycle (0.2C), the 5th cycle (1C), and the 100th cycle (1C), respectively, as well as a discharge capacity retention rate of 86% after the 100th cycle relative to that at the 5th cycle, and a 10C/0.2C retention rate of 53%.

Comparative Example 2

The same procedures as in Example 1 were carried out to prepare Sample 7 that is titanium-niobium composite oxide particles coated with 2.2 wt. % of carbon, except that anatase-type titanium oxide powder and niobium oxide powder were weighed in a molar ratio of Ti:Nb=1:2.05. An analysis of Sample 7 that was conducted in the same manner as in Example 1 revealed that Sample 7 had a Nb/Ti molar ratio of 2.05, a crystallite size of 100 nm, a specific resistance (powder) of 86 Ω·cm, and an average secondary particle size of 7.9 μm. A coin battery using Sample 7 was prepared and its battery performance was evaluated, revealing that the battery had discharge capacities of 281 mAh/g, 267 mAh/g, and 221 mAh/g at the 1st cycle (0.2C), the 5th cycle (1C), and the 100th cycle (1C), respectively, as well as a discharge capacity retention rate of 83% after the 100th cycle relative to that at the 5th cycle, and a 10C/0.2C retention rate of 52%.

Comparative Example 3

Sample 1, which had an average secondary particle size of 9.7 μm, was pulverized with an automatic mortar manufactured by Ishikawa Kojo to break down the aggregate to prepare Sample 8 that is titanium-niobium composite oxide particles coated with 2.1 wt. % of carbon. An analysis of Sample 8 that was conducted in the same manner as in Example 1 revealed that Sample 8 had a Nb/Ti molar ratio of 1.99, a crystallite size of 85 nm, a specific resistance (powder) of 150 Ω·cm, and an average secondary particle size of 0.9 μm. A coin battery using Sample 8 was prepared and its battery performance was evaluated, revealing that the battery had discharge capacities of 281 mAh/g, 131 mAh/g, and 246 mAh/g at the 1st cycle (0.2C), the 5th cycle (1C), and the 100th cycle (1C), respectively, as well as a discharge capacity retention rate of 53% after the 100th cycle relative to that at the 5th cycle, and a 10C/0.2C retention rate of 35%.

Comparative Example 4

The same procedures as in Example 1 were carried out to prepare Sample 9 that is titanium-niobium composite oxide particles coated with a layer containing 2.1 wt. % of carbon, except that the final heat treatment was carried out under a non-oxidizing atmosphere at 600° C. for 3 hours. In Sample 9, carbonization did not proceed because the firing temperature was low, and uncarbonized maltose powder remained in the coating. An analysis of Sample 9 that was conducted in the same manner as in Example 1 revealed that Sample 9 had a Nb/Ti molar ratio of 1.99, a crystallite size of 98 nm, a specific resistance (powder) of 20800 Ω·cm, and an average secondary particle size of 9.5 μm. A coin battery using Sample 9 was prepared and its battery performance was evaluated, revealing that the battery had discharge capacities of 281 mAh/g, 256 mAh/g and 222 mAh/g at the 1st cycle (0.2C), the 5th cycle (1C) and at the 100th cycle (1C), respectively, as well as a discharge capacity retention rate of 87% after the 100th cycle relative to that at the 5th cycle, and a 10C/0.2C retention rate of 43%.

Tables 1 and 2 summarize the compositions of Samples 1 to 9 and their crystallite sizes, specific resistances (powder), average secondary particle sizes, discharge capacities, discharge capacity retention rates at the 100th cycle relative to that at the 5th cycle, and 10C/0.2C retention rates.

TABLE 1

| Sample No. | Composition X | Crystallite size (nm) | Carbon content (wt. %) | Specific resistance (powder) (Ω·cm) | Average secondary particle size (μm) |
|---|---|---|---|---|---|
| Ex. 1 | 1 | 1.99 | 97 | 2.2 | 100 | 9.7 |
| Ex. 2 | 2 | 1.92 | 100 | 2.1 | 85 | 12.5 |
| Ex. 3 | 3 | 1.99 | 96 | 2.1 | 1230 | 8.9 |
| Ex. 4 | 4 | 1.99 | 96 | 1.5 | 96 | 7.7 |
| Ex. 5 | 5 | 1.94 | 94 | 3.6 | 39 | 9.0 |
| Comp. Ex. 1 | 6 | 1.85 | 98 | 2.1 | 72 | 8.1 |
| Comp. Ex. 2 | 7 | 2.05 | 100 | 2.2 | 86 | 7.9 |
| Comp. Ex. 3 | 8 | 1.99 | 85 | 2.1 | 150 | 0.9 |
| Comp. Ex. 4 | 9 | 1.99 | 98 | 2.1 | 20800 | 9.5 |

TABLE 2

| | | Cycle characteristics | | Rate characteristics | | |
|---|---|---|---|---|---|---|
| | | Discharge capacity (mAh/g) at 1st cycle | Discharge capacity retention rate (%) at 100th | Discharge capacity (mAh/g) | | 10 C/0.2 C retention rate |
| Sample No. | | (0.2 C) | cycle | 0.2 C | 10 C | (%) |
| Ex. 1 | 1 | 288 | 90 | 253 | 140 | 55.3 |
| Ex. 2 | 2 | 286 | 92 | 258 | 152 | 58.9 |
| Ex. 3 | 3 | 284 | 93 | 246 | 125 | 50.8 |
| Ex. 4 | 4 | 286 | 90 | 241 | 119 | 49.3 |
| Ex. 5 | 5 | 286 | 95 | 250 | 138 | 55.2 |
| Comp. Ex. 1 | 6 | 280 | 86 | 249 | 131 | 52.6 |
| Comp. Ex. 2 | 7 | 281 | 83 | 249 | 131 | 52.6 |
| Comp. Ex. 3 | 8 | 281 | 53 | 257 | 91 | 35.4 |
| Comp. Ex. 4 | 9 | 281 | 87 | 239 | 103 | 43.1 |

What is claimed is:

1. An electrode active material comprising in major proportions a monoclinic titanium-niobium composite oxide represented by the formula $TiNb_xO_{(2+5x/2)}$, wherein X is from 1.90 or more to less than 2.00.

2. The electrode active material of claim 1, wherein the titanium-niobium composite oxide has a crystallite size of 85 urn or more as determined from a full-width at half maximum of a (−110) X-ray diffraction line, a coating with 1.0 to 5.0 wt. % of carbon and a specific resistance (powder) of $1.0 \times 10^4$ Ω·cm or less, and wherein the titanium-niobium composite oxide forms secondary particles present in the form of a spherical or massive aggregate of primary particles of the titanium-niobium composite oxide and the secondary particles have an average secondary particle size of 1 to 50 μm.

3. The electrode active material of claim 2, wherein the titanium-niobium composite oxide has a coating with 1.5 to 3.6 wt. % of carbon.

4. The electrode active material of claim 2, wherein a lithium secondary battery prepared using Li metal as a counter electrode has a discharge capacity of 280 mAh/g or more at 1st cycle in a charge and discharge test conducted at 54 mA per gram of the active material and has a discharge capacity retention rate of 90% or more after the 100th cycle relative to that at the 5th cycle.

5. The electrode active material of claim 1, wherein said electrode active material further comprises a conducting agent and a binder, wherein the weight ratio between the titanium-niobium composite oxide particles, the conducting agent, and the binder is 90:5:5 to 70:15:15.

6. A battery electrode comprising an electrode active material comprising in major proportions a monoclinic titanium-niobium composite oxide represented by the formula $TiNb_xO_{(2+5x/2)}$, wherein X is from 1.90 or more to less than 2.00 as a cathode or anode active material.

7. A lithium secondary battery comprising a battery electrode comprising an electrode active material comprising in major proportions a monoclinic titanium-niobium composite oxide represented by the formula $TiNb_xO_{(2+5x/2)}$, wherein X is from 1.90 or more to less than 2.00 as a cathode or anode active material.

8. The lithium secondary battery of claim 7,
wherein the titanium-niobium composite oxide has a crystallite size of 85 nm or more as determined from a full-width at half maximum of a (−110) X-ray diffraction line, a coating with 1.0 to 5.0 wt. % of carbon and a specific resistance (powder) of $1.0 \times 10^4$ Ω·cm or less,
wherein the titanium-niobium composite oxide forms secondary particles present in the form of a spherical or massive aggregate of primary particles of the titanium-niobium composite oxide and the secondary particles have an average secondary particle size of 1 to 50 μm, and
wherein the battery comprises Li metal as a counter electrode, and has a discharge capacity of 280 mAh/g or more at 1st cycle in a charge and discharge test conducted at 54 mA per gram of the active material and has a discharge capacity retention rate of 90% or more after the 100th cycle relative to that at the 5th cycle.

9. The lithium secondary battery of claim 7, wherein said electrode active material further comprises a conducting agent and a binder, wherein the weight ratio between the titanium-niobium composite oxide particles, the conducting agent, and the binder is 90:5:5 to 70:15:15.

10. A method for producing an electrode active material comprising in major proportions a monoclinic titanium-niobium composite oxide represented by the formula $TiNb_xO_{(2+5x/2)}$, wherein X is from 1.90 or more to less than 2.00, the method comprising:
mixing a titanium source material and a niobium source material in a Nb/Ti molar ratio of from 1.90 or more to less than 2.00 to prepare a source material mixture; and
firing the source material mixture at 1000 to 1300° C. under an oxidizing atmosphere to prepare a fired product.

11. The method of claim 10, further comprising:
a carbon source addition step of mixing the fired product and an organic material to prepare a mixture; and
a carbon coating formation step of heating the mixture to 650 to 800° C. under a non-oxidizing atmosphere to decompose and carbonize the organic material to form a carbon coating on a surface of the titanium-niobium composite oxide particles.

* * * * *